United States Patent
Inagaki et al.

(10) Patent No.: US 12,050,271 B2
(45) Date of Patent: Jul. 30, 2024

(54) TOF CAMERA

(71) Applicant: National Institute of Information and Communications Technology, Tokyo (JP)

(72) Inventors: Keizo Inagaki, Tokyo (JP); Toshimasa Umezawa, Tokyo (JP); Naokatsu Yamamoto, Tokyo (JP); Tetsuya Kawanishi, Tokyo (JP)

(73) Assignee: National Institute of Information and Communications Technology, Tokyo (JP)

(*) Notice: Subject to any disclaimer, the term of this patent is extended or adjusted under 35 U.S.C. 154(b) by 803 days.

(21) Appl. No.: 17/278,306

(22) PCT Filed: Jun. 3, 2019

(86) PCT No.: PCT/JP2019/021923
§ 371 (c)(1),
(2) Date: Mar. 20, 2021

(87) PCT Pub. No.: WO2020/059217
PCT Pub. Date: Mar. 26, 2020

(65) Prior Publication Data
US 2021/0364642 A1    Nov. 25, 2021

(30) Foreign Application Priority Data
Sep. 21, 2018  (JP) ................................ 2018-178087

(51) Int. Cl.
*G01S 17/89*    (2020.01)
*G01S 7/48*     (2006.01)
(Continued)

(52) U.S. Cl.
CPC .......... *G01S 17/894* (2020.01); *G01S 7/4808* (2013.01); *G02F 1/295* (2013.01); *G01S 7/4818* (2013.01)

(58) Field of Classification Search
None
See application file for complete search history.

(56) References Cited

U.S. PATENT DOCUMENTS

| 5,694,204 A | 12/1997 | Nakase et al. |
| 9,964,431 B1 | 5/2018 | Moore et al. |

(Continued)

FOREIGN PATENT DOCUMENTS

| JP | 1996-105712 | 4/1996 |
| JP | 2005-283683 A | 10/2005 |

(Continued)

*Primary Examiner* — Hovhannes Baghdasaryan
(74) *Attorney, Agent, or Firm* — Liang Legal Group, PLLC (57) ABSTRACT

[Problem] To provide a camera with high sensitivity even if an output to the outside is weak. [Solution] This camera includes a light source 3, a demultiplexing unit 5 which demultiplexes light from the light source 3 into first demultiplexed light and second demultiplexed light, a first modulator 7 which modulates the first demultiplexed light to obtain a modulated signal, an emission unit 9 which emits the modulation signal modulated by the first modulator 7, and a phase imparting means 11 which imparts a plurality of types of phase shifts to the second demultiplexed light to obtain phase-imparted local light. The camera further includes a multiplexing unit 13 which multiplexes light incident from the outside of the camera and the phase-imparted local light and obtains multiplexed light, a light receiving element 17 which detects the multiplexed light, and includes a light receiving unit 15, and an analysis processing unit 19 which, on the basis of the multiplexed (Continued)

light received by the light receiving element 17, analyzes the position of a subject or the distance between the subject and the camera.

4 Claims, 4 Drawing Sheets

(51) Int. Cl.
  *G01S 17/894* (2020.01)
  *G02F 1/295* (2006.01)
  *G01S 7/481* (2006.01)

(56) References Cited

U.S. PATENT DOCUMENTS

| | | |
|---|---|---|
| 2014/0055771 A1 | 2/2014 | Oggier |
| 2015/0181099 A1 | 6/2015 | Van Der Tempel et al. |
| 2016/0231420 A1* | 8/2016 | Kryvobok ............... G01S 17/34 |
| 2018/0224547 A1 | 8/2018 | Crouch et al. |

FOREIGN PATENT DOCUMENTS

| | | |
|---|---|---|
| JP | 2015-513825 A | 5/2015 |
| JP | P6228547 | 10/2017 |

\* cited by examiner

TOF SIGNAL PROCESSING TIME
~ 10μs (RESOLUTION = 100)   OPTICAL PHASED ARRAY CONTROL SIGNAL

IMAGE ACQUISITION TIME
~ 1ms (1000 FRAME/SEC)

TOF CAMERA

TECHNICAL FIELD

The present invention relates to a TOF camera.

BACKGROUND ART

Japanese Patent No. 6228547 describes a TOF camera.

CITATION LIST

Patent Documents

[Patent Document 1] Japanese Patent No. 6228547

SUMMARY OF INVENTION

Problems to be Solved by the Invention

A TOF camera is mounted, for example, on an autopilot vehicle and is used to grasp a surrounding situation during automatic driving. In this case, it is conceivable that the intensity of the emitted light is reduced to prevent light emitted from a host vehicle from blinding others. However, in such a case, the sensitivity of the TOF camera may not be sufficient.

In addition, when the same TOF camera as that of the host vehicle is mounted on the oncoming vehicle, and strong light is received from the oncoming vehicle, a light-receiving element of the host vehicle is saturated, so that it may be difficult to correctly grasp the surrounding situation.

Furthermore, simply improving the sensitivity of the TOF camera will easily saturate the light-receiving element in the presence of background light such as sunlight. This also makes it difficult to correctly grasp the surrounding situation.

An object of the present invention described herein is to solve some of the aforementioned problems.

Means for Solving the Problems

The invention described herein is basically based on knowledge that, even when the intensity of the emitted light is weak, it is possible to increase an intensity of light input to a detector and thereby improve sensitivity of the TOF camera by demultiplexing the light from a relatively strong light source, emitting a weak component toward a target, and multiplexing light reflected from the target and the strong component of the demultiplexed light. A preferable example of the present invention is based on knowledge that it is possible to prevent saturation of the light-receiving element and thereby correctly grasp the surrounding situation by flexibly changing an oscillation wavelength when light emitted from an oncoming vehicle is received. In addition, a preferable example of the present invention is based on knowledge that it is possible to reduce the effects of saturation or noise caused by background light by arranging a bandpass optical filter that transmits a change of the oscillation wavelength or more to the front surface of the light-receiving element and arranging an electric lowpass filter in rear of the detector. Note that, even when the oscillation wavelength is changed, the wavelength of the light reflected to the target and the wavelength of the demultiplexed strong intensity light are changed in the similar way, so that it is not necessary to change a transmission characteristic of the electric lowpass filter.

A first invention herein relates to a camera. This camera includes a light source 3, a demultiplexing unit 5, a first modulator 7, an emission unit 9, and a phase imparting means 11. This camera further includes a multiplexing unit 13, a light-receiving element 17, and an analysis processing unit 19. This camera may include an element known in the art and included in a typical camera (in particular, a camera used in LIDAR) as appropriate.

The demultiplexing unit 5 is an element for demultiplexing light from the light source 3 into a first demultiplexed light and a second demultiplexed light. The first modulator 7 is an element for modulating the first demultiplexed light to obtain a modulated signal. The emission unit 9 is an element for emitting the modulated signal modulated by the first modulator 7. The phase imparting means 11 is an element for imparting a plurality of types of phase shifts to the second demultiplexed light to obtain a phase-imparted local light.

The multiplexing unit 13 is an element for multiplexing the light incident from the outside of the camera and the phase-imparted local light to obtain multiplexed light. The light-receiving element 17 is an element having a light-receiving unit 15 that detects the multiplexed light. The light-receiving unit 15 preferably corresponds to the phase imparting means 11. The analysis processing unit 19 is an element for analyzing a position of a subject or a distance between the subject and the camera on the basis of the multiplexed light received by the light-receiving element 17.

A preferable aspect of this camera further includes a frequency adjusting means 33 that changes an emission wavelength of the light source 3 and a control unit 35 that controls the frequency adjusting means 33. In addition, the control unit 35 controls the frequency adjusting means 33 to change the emission wavelength of the light source 3 when the light-receiving element 17 receives light having a frequency equal to that of the first demultiplexed light and an intensity equal to or stronger than a threshold value.

In a preferable aspect of this camera, the light-receiving element 17 includes a plurality of light-receiving device elements 15a aligned in at least one line. In addition, this camera obtains a first synchronization signal by synchronizing the light incident from the outside of the camera and the phase-imparted local light through digital signal processing for at least one of electric signals from the plurality of light-receiving device elements 15a when twice the distance between the subject and the camera is longer than a coherent length of the light from the light source. The electric signal from the light-receiving element 17 is processed using the first synchronization signal to synchronize the light incident from the outside of the camera and the phase-imparted local light.

A preferable aspect of this camera further includes a bandpass optical filter provided on a front surface of the multiplexing unit or on a front surface of the light-receiving element and a lowpass filter provided between the light-receiving element and the analysis processing unit. In addition, a transmission band of the bandpass optical filter is wider than a change width of an emission wavelength caused by the frequency adjusting means, and a cut-off frequency of the lowpass filter is higher than a modulation frequency of the demultiplexed light.

Advantageous Effects

According to the present invention, it is possible to increase the intensity of the reflected light by amplifying the signal using local light in the multiplexing unit even when the intensity of the emitted light is weak. As a result, it is possible to achieve sufficient sensitivity.

In addition, when the same TOF camera as that of the host vehicle is mounted on the oncoming vehicle, and the frequency of the light from the light source of the oncoming vehicle is equal to the frequency of the light from the TOF camera of the host vehicle, it is possible to suppress erroneous detection by shifting the light from the light source of the host vehicle. In addition, it is possible to suppress influence from the light from the oncoming vehicle by using a filter as appropriate. Even when background light such as sunlight exists, it is possible to suppress components other than the reflected light and correctly grasp the surrounding situation by increasing the signal intensity by virtue of the local light and using the optical filter.

BRIEF DESCRIPTION OF DRAWINGS

FIG. 4 is a conceptual diagram illustrating an example of a light-receiving element, in which

DETAILED DESCRIPTION OF INVENTION

Embodiments of the present invention will now be described with reference to the accompanying drawings. The embodiments described below are not intended to limit the present invention, and also include an appropriate modification within the scope apparent to those skilled in the art from the following embodiments.

The first invention herein relates to a camera. This camera is, for example, a camera used for LIDAR, and may also function as a LIDAR system. That is, ideally, this camera can measure a distance to a target outside of an object where the camera is mounted, and as a result, can analyze a shape of the object, thereby obtaining three-dimensional image information of the target. From the viewpoint of measuring the distance and obtaining information on the target, this camera may be a kind of TOF (time-of-flight) camera. This camera may analyze a distance between a subject such as an obstacle around the target where the camera is mounted and the target, or may analyze the subject by grasping a three-dimensional positional relationship of the subject. LIDAR is one of the remote sensing technologies based on light. For example, scattered light with respect to laser irradiation is measured, and a distance to a distant target or a property of the target is analyzed.

Figure 1:
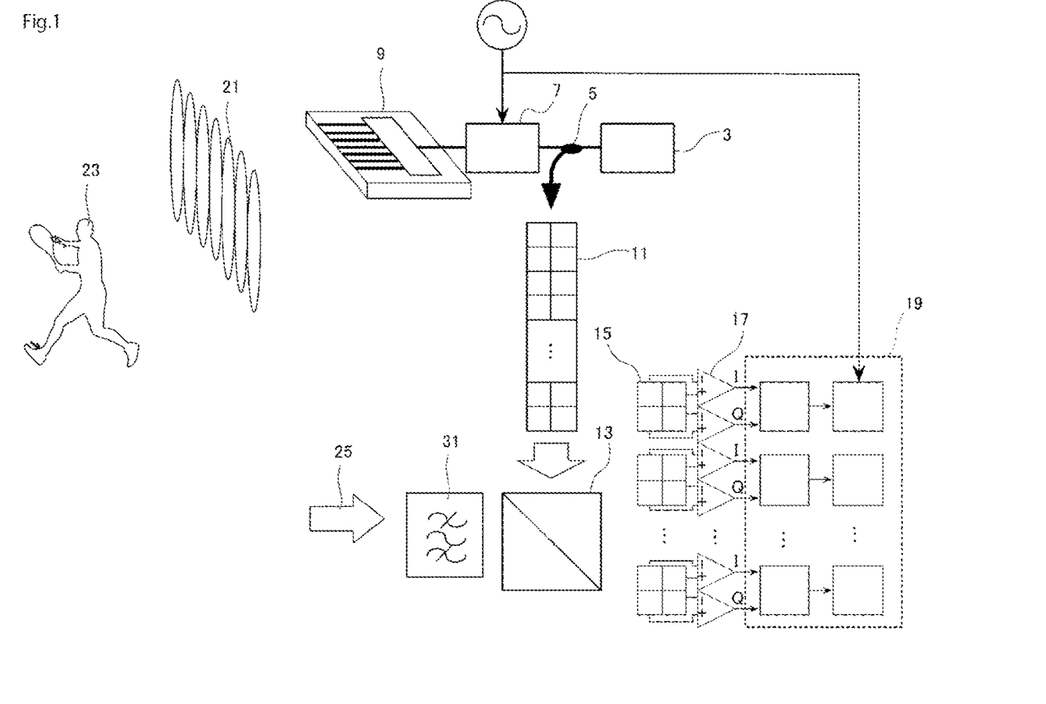
FIG. 1 is a conceptual diagram for explaining a camera.

FIG. 1 is a conceptual diagram for explaining the camera. As illustrated in FIG. 1, this camera includes a light source 3, a demultiplexing unit 5, a first modulator 7, an emission unit 9, and a phase imparting means 11. This camera further includes a multiplexing unit 13, a light-receiving element 17, and an analysis processing unit 19. This camera may also include an element known in the art and included in a typical camera (particularly, a camera used in LIDAR) as appropriate.

As the light source 3, a light source known in the art may be employed as appropriate. Examples of the light emitted from the light source include laser, infrared rays, visible light, ultrasonic waves, and electromagnetic waves. The light may be continuous light or pulsed light. Preferably, a laser light source is employed as the light source in order to sufficiently measure a distance even at night. Preferably, LIDAR (Light Detection and Ranging, or Laser Imaging Detection and Ranging) is used as a distance detection sensor. LIDAR is a device that emits laser into a two-dimensional or three-dimensional space within a predetermined distance measurement area to measure distances of a plurality of measurement points within the distance measurement area. For example, the LIDAR emits laser from the light-emitting unit, detects reflected light reflected by an object using the light-receiving unit, and calculates a light-receiving distance on the basis of a time difference between the emitted time and the light-receiving time. Assuming that the laser emitted from the light-emitting unit hits a stationary object separated by a distance L0, the laser travels by a distance (2L0) equivalent to twice the distance L0 from the tip of the light-emitting unit to the surface of the object, and is received by the light-receiving unit. The laser-emitting time and the laser-receiving time are deviated by the time T0 required for the laser to travel the aforementioned distance (2L0). That is, there is a time difference. The light-receiving distance L0 can be calculated by using the time difference T0 and the velocity of light. In addition, a distance to the object (obstacle) is detected from the calculated light-receiving distance L0. The intensity of the light emitted from the light source may be adjusted as appropriate.

The demultiplexing unit 5 is an element for demultiplexing (for example, intensity demultiplexing) the light from the light source 3 into a first demultiplexed light and a second demultiplexed light. A light-receiving system of the conventional TOF camera directly observes the intensity of the reflected light from a target (subject). For this reason, it is necessary to irradiate extremely strong light in the conventional TOF camera. For this reason, when the conventional TOF camera is employed, for example, a pedestrian may lose his eyesight. When the subject has a light-receiving device, the light-receiving device may be damaged. Since the camera herein has the demultiplexing unit 5 and the multiplexing unit 13, the intensity of the emitted light can be suppressed, and the component reflected and returned from the subject can be recovered to the intensity sufficient to be detected. Therefore, this camera can reduce the intensity of the light emitted to the outside of the camera for detection, and can suppress influence on a pedestrian or the like.

An example of the demultiplexing unit 5 is a photocoupler. For example, an intensity ratio between the first demultiplexed light and the second demultiplexed light may be set to 1:1000 to 1:2, 1:500 to 1:5, 1:100 to 1:5, 1:100 to 1:10, or 1:50 to 1:5. In any case, it is preferable that the first demultiplexed light has a weaker light intensity than that of the second demultiplexed light. Preferably, the light intensity of the first demultiplexed light is set, for example, such that safety is not impaired even when it is irradiated to the human eye.

The first modulator 7 is an element for modulating the first demultiplexed light to obtain a modulated signal. Examples of the modulator 7 include an intensity modulator and a phase modulator. Among them, the intensity modulator is preferable, and the intensity modulator preferably has a Mach-Zehnder type waveguide. Since the camera has the modulator, it is possible to accurately grasp what timing the emitted light is emitted even when the first demultiplexed light is continuously emitted.

Figure 2:
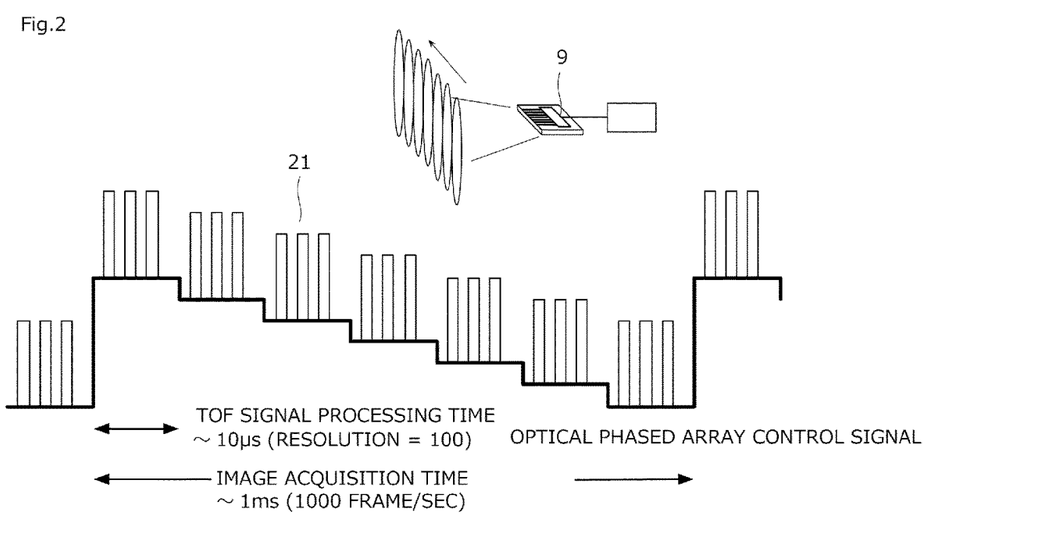
FIG. 2 is a conceptual diagram for explaining emission light from an emission unit.

FIG. 2 is a conceptual diagram for explaining the light emitted from the emission unit. The light emitted from the emission unit reflects the modulation in the first modulator. In the example illustrated in the upper half of FIG. 2, the emitted light has a fan-shaped elongated shape that spreads vertically so as to cover the entire up-down direction of the target area where three-dimensional position information is to be obtained and is horizontally narrowed down to satisfy a position resolution required in the left-right direction of the target area, so that its emission direction is scanned in the left-right direction with time to irradiate all of the top, bottom, left, and right sides of the target area. The example illustrated in the lower half of FIG. 2 shows a temporal diagram. The thick solid line indicates a signal applied to a phase control portion of the emission unit 9 in order to scan in the left-right direction the fan-shaped beam extending in the up-down direction in a stepwise manner. The thin solid line 21 indicates how the fan-shaped beam extending in the up-down direction is modulated by the first modulator. The modulated emission light for one or more periods (three periods in the example of FIG. 2) while the fan-shaped beam irradiates a specific direction (in the example illustrated in the lower half of FIG. 2, the TOF signal processing time: approximately 10 μs) is transmitted to the target to measure the distance from the camera to the target area. Then, the light modulated as described above is transmitted by slightly changing the left and right irradiation directions of the fan-shaped beam to measure the distance to the target area. Note that, although it is difficult to identify the up-down direction of the target area merely by controlling the emission direction as described above, it is identified by arranging the light-receiving elements 17 of FIG. 1 so as to satisfy the position resolution required in the up-down direction and processing the signals in parallel. By repeating the aforementioned operation, it is possible to acquire the three-dimensional position information of the target area after the image acquisition time (in the example of FIG. 2, ~1 ms).

The emission unit 9 is an element for emitting the modulated signal modulated by the first modulator 7. As illustrated in FIG. 1, it is preferable that the emission unit 9 is configured such that the modulated signal output from the first modulator 7 is demultiplexed into a plurality of signals, and as a result, the plurality of modulated signals are emitted in a plurality of directions. An example of the emission unit 9 has a substrate, an incident unit provided on the substrate on which the modulated signal is incident, a first waveguide connected to the incident unit, a branching unit that branches the light from the first waveguide into a plurality of waveguides, and a phase control unit that controls relative phases of the lights propagating through the plurality of waveguides. An example of such a phase control unit is an optical waveguide provided on an LN (lithium niobate) substrate having an electro-optical effect or an optical waveguide formed of an EO polymer. In addition to them, an InP optical waveguide capable of controlling the phase on the basis of an electron density, or an Si or $SiO_2$ optical waveguide capable of controlling the phase on the basis of the thermo-optical effect of a very small-sized heater may also be employed. It is preferable that the light 21 emitted from the emission unit 9 is coherent light. Using the coherent light, it is possible to observe a target placed in a long distance (for example, 10 m or longer and 100 m or shorter from the camera) even when the light intensity is relatively weak. Furthermore, using the coherent light, it is possible to easily obtain a signal enhancement effect due to constructive interferences with local light. The emission unit 9 may further have a phase control unit. When the emitting unit 9 has the phase control unit, it is possible to perform phase modulation for each of the plurality of emitted lights.

Figure 3:
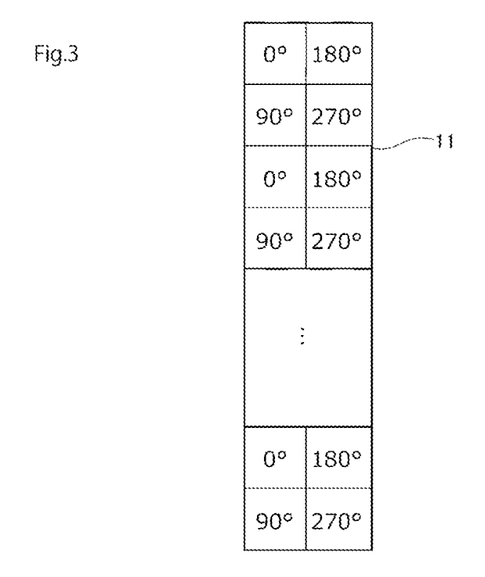
FIG. 3 is a conceptual diagram illustrating a phase plate array as an example of a phase imparting means.

The phase imparting means 11 is an element for imparting a plurality of types of phase shifts to the second demultiplexed light to obtain a phase-imparted local light. FIG. 3 is a conceptual diagram illustrating a phase plate array as an example of the phase imparting means. As illustrated in FIG. 3, an example of the phase imparting means 11 has a plurality of types of phase plate regions. Using a plurality of phase plate regions, different phases can be imparted to the transmitted light for each region. For this reason, different types of phase shifts can be imparted to each region of the second demultiplexed light. As a result, it is possible to obtain the second demultiplexed light having a plurality of types of phases. The plurality of types are not particularly limited as long as it is two or more types (for example, four types). The example of FIG. 3 has out-of-phase portions whose phases are deviated by 90°, 180°, and 270° with respect to a certain portion (this portion is defined as "0°"). Such a phase imparting means 11 is, for example, a substrate having a refractive index different from that of air, and different thicknesses may be applied to each region. In addition, a phase plate having a plurality of phase plate portions may be formed by using a phase plate formation technique such as the self-cloning technique. The second demultiplexed light is used, for example, as local light (L0). Since the phase imparting means 11 can impart a plurality of phase differences, it is possible to obtain a phase shift (phase fluctuation), amplitude fluctuation, and an external light offset between the emitted light and the received light, for example, by using four measurement values. The phase imparting means 11 may also be implemented by a device having a plurality of phase modulators (having a plurality of second phase modulators). It is possible to impart a plurality of types of phase shifts to the second demultiplexed light, for example, by demultiplexing the second demultiplexed light and performing phase modulation for each demultiplexed light.

The multiplexing unit 13 is an element for multiplexing the light incident from the outside of the camera and the phase-imparted local light to obtain the multiplexed light. The light 25 incident from the outside of the camera may contain light obtained by reflecting the modulated signal originated from the first demultiplexed light by the target 23 in some cases. In this case, since such a component constructively interferes with the phase-imparted local light, it is possible to sufficiently detect the reflected light even when the intensity of the first demultiplexed light or the modulated signal is weak.

In front of the multiplexing unit 13 (between the multiplexing unit 13 and the outside of the camera), an optical filter 31 may be provided for suppressing the intensities of other lights using the reflected light (or the first demultiplexed light or the modulated signal originated from the first demultiplexed light). The optical filter 31 may exist between the multiplexing unit 13 and the light-receiving element 17. Examples of such an optical filter include a bandpass optical filter and a bandpass filter (BPF). Since the camera according to the present invention can identify the frequency of the first demultiplexed light or its modulated signal, and estimate the frequency of the reflected light, an optical filter capable of transmitting a frequency band of such light (one of or two or more of the first demultiplexed light, its modulated signal, and the reflected light) and suppressing the intensity of the light belonging to the other frequency range may be employed as appropriate. When the transmission bandwidth of the optical filter is excessively wide, the optical filter may not function. Meanwhile, when the transmission bandwidth of the optical filter is excessively narrow, it is difficult to perform observation when changing the frequency of the light from the light source to avoid interference. From this viewpoint, the transmission bandwidth of the optical filter may be set to a wavelength range of 1 nm to 100 nm, 2 nm to 50 nm, or 5 nm to 20 nm.

The light-receiving element 17 is an element for detecting the multiplexed light. In addition, the light-receiving element has a light-receiving unit 15. An example of the light-receiving unit corresponding to the phase imparting means 11 is a light-receiving unit corresponding to each phase plate region of the phase imparting means 11. As a specific example, the phase imparting means 11 has a portion for imparting a plurality of types of phases (phase plate regions), and a light-receiving element corresponding to each portion exists. An example of the light-receiving unit is a PD (photodiode). In the example of FIG. 1, the multiplexed light is detected by the PD array in a homodyne manner.

Figures 4A, 4B:
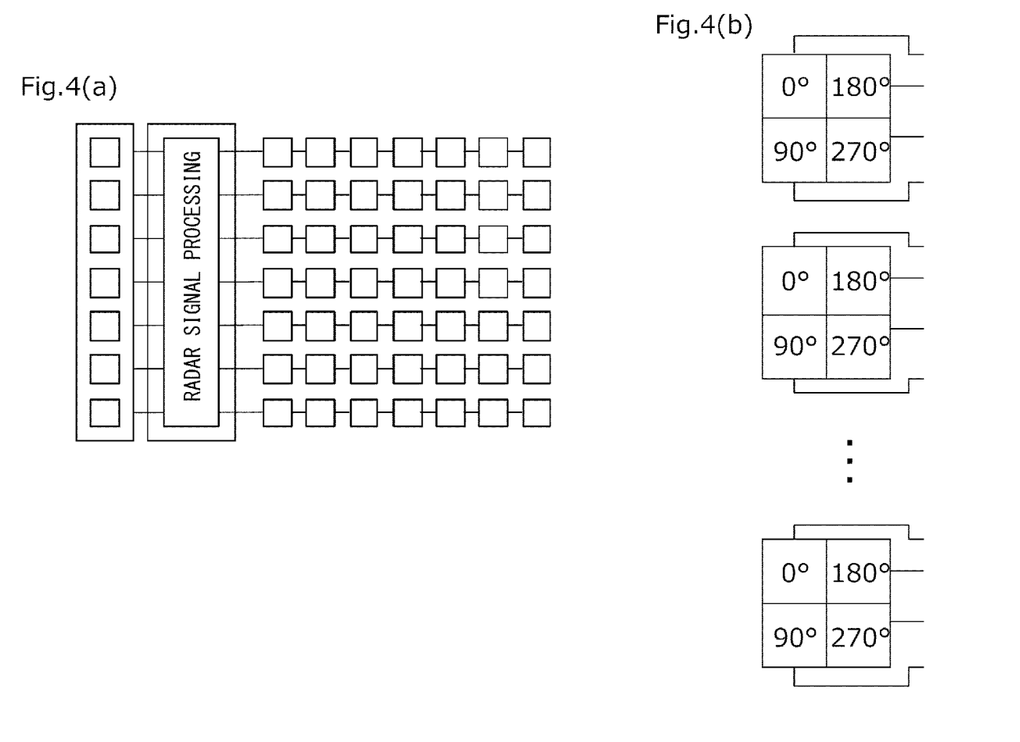
FIG. 4(a) illustrates a state that each modulated signal output from an output unit corresponds to each cell in the horizontal direction, and those corresponding to a plurality of types of phases generated by a phase imparting means (or a plurality of phase plate regions) correspond to each cell in the vertical direction.
FIG. 4(b) is a conceptual diagram illustrating a light-receiving element including a PD array having four pixel portions.

FIG. 4 is a conceptual diagram illustrating an example of the light-receiving element. In FIG. 4(a), each modulated signal output from the output unit corresponds to each cell in the horizontal direction, and those corresponding to a plurality of types of phases (or a plurality of phase plate regions) imparted by the phase imparting means correspond to each cell in the vertical direction. FIG. 4(b) is a conceptual diagram illustrating the light-receiving element including the PD array having four pixel portions.

The analysis processing unit 19 is an element for analyzing a position of the subject or a distance between the subject and the camera on the basis of the multiplexed light received by the light-receiving element 17. For example, four pixels of the PD array output correspond to one pixel in the output image. In addition, the pixel output corresponding to the 0° and 180° phase plate regions of the phase imparting means 11 is the in-phase component I, and the pixel output corresponding to the 90° and 270° phase plate regions of the phase imparting means 11 is the output of the orthogonal component Q. A sum of squares ($I^2+Q^2$) of the in-phase component and the orthogonal component is the received light intensity. By performing signal processing in the manner similar to the indirect TOF or LIDER, a phase shift in the received intensity-modulated light can be detected, and the distance to the target can be obtained on the basis of the detected phase shift.

A low-pass filter may be provided between the light-receiving element and the analysis processing unit. For example, when light from another TOF camera is received, the light from another TOF camera can be removed using the lowpass filter by changing the frequency of the light from the light source 3 within a frequency range that is not suppressed by the bandpass optical filter.

Figure 5:
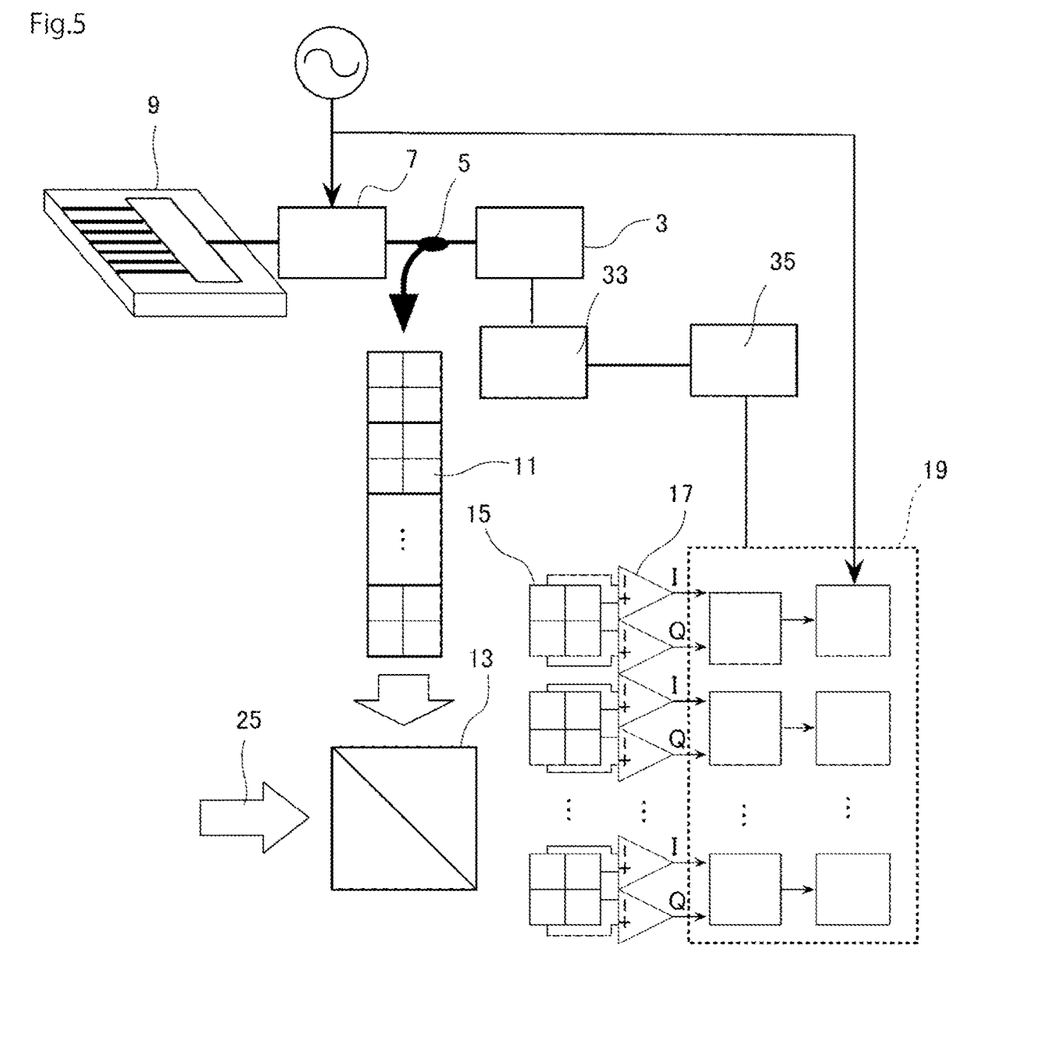
FIG. 5 is a conceptual diagram illustrating a configuration example of a camera capable of changing an emission wavelength of light from a light source.

A preferable aspect of this camera further has a frequency adjusting means 33 that changes an emission wavelength of the light source 3 and a control unit 35 that controls the frequency adjusting means 33. In addition, when the light-receiving element 17 receives light having the same frequency as that of the first demultiplexed light and having an intensity equal to or stronger than a threshold value, the control unit 35 controls the frequency adjusting means 33 to change the emission wavelength of the light source 3. FIG. 5 is a conceptual diagram illustrating a configuration example of a camera capable of changing the emission wavelength of the light from the light source. In this example, for example, it is assumed that a system having a light source similar to this camera approaches from the outside. Then, light overwhelmingly stronger than the light reflected from the target 23 is emitted from the system. In this case, the control unit 35 receives information from the analysis processing unit 19 regarding a fact that the light intensity exceeding the threshold value is observed. In addition, the control unit 35 changes the wavelength of the light emitted from the light source 3 by using the frequency adjusting means 33. Then, the wavelength (frequency) of the optical component constructively interfering by the multiplexing unit 13 changes. Therefore, it is possible to reduce a noise originated from the opposing system.

As a preferable aspect of the camera, the light-receiving element 17 includes a plurality of light-receiving device elements 15a aligned in at least one line. An example of the plurality of light-receiving device elements 15a is a PD array. In addition, in this camera, when twice the distance between the subject and the camera is longer than the coherent length of the light from the light source, a first synchronization signal is obtained by synchronizing the light incident from the outside of the camera (reflected light) and the phase-imparting local light by performing digital signal processing for at least one of the electric signals from the plurality of light-receiving device elements 15a. The electric signal from the light-receiving element 17 is processed using the first synchronization signal to synchronize the light incident from the outside of the camera and the phase-imparted local light.

A preferable aspect of this camera further has a bandpass optical filter provided on the front surface of the multiplexing unit or the front surface of the light-receiving element and a lowpass filter provided between the light-receiving element and the analysis processing unit. In addition, a transmission band of the band pass optical filter is wider than a change width of the emission wavelength caused by the frequency adjusting means, and the cut-off frequency of the lowpass filter is higher than the modulation frequency of the first demultiplexed light.

As a preferable aspect of this camera, the phase imparting means 11 and the multiplexing unit 13 (or further the light source 3, the demultiplexing unit 5, and the first modulator 7) exist inside one casing. When such elements exist inside the casing, it is possible to reduce a situation where the light from the light source 3 leaks out or a situation where the light from the outside intrudes.

Figure 6:
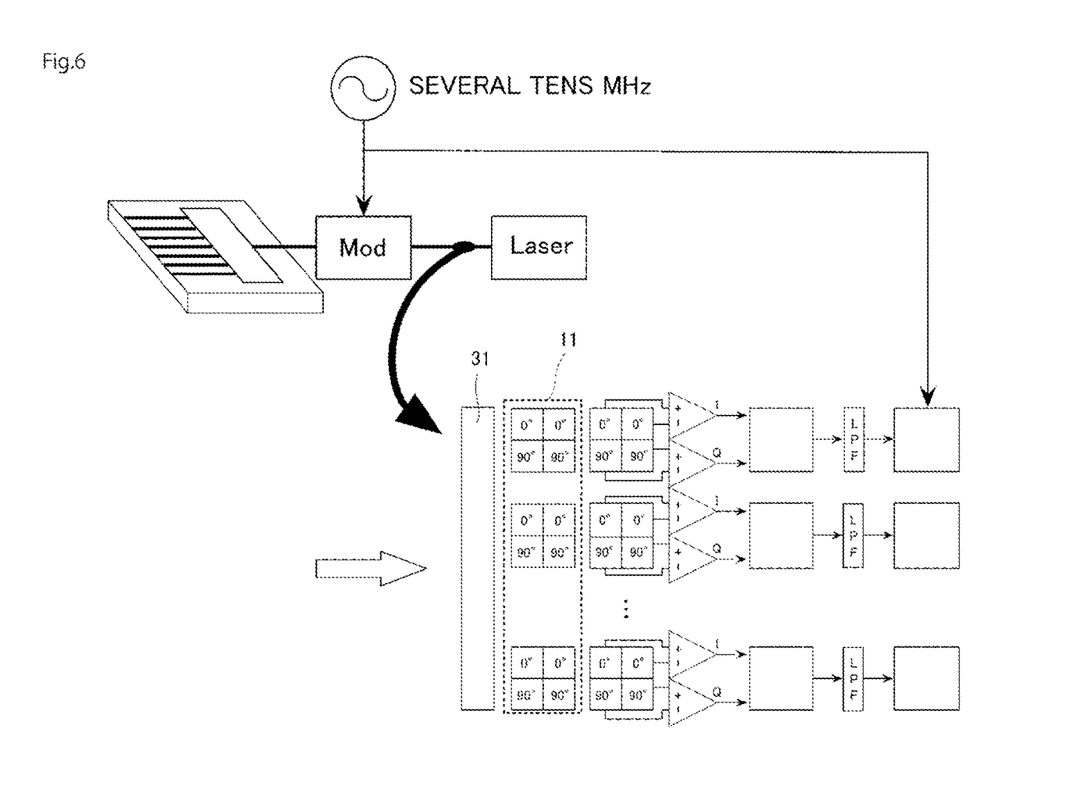
FIG. 6 is a conceptual diagram illustrating another aspect of the camera different from that described above.

FIG. 6 is a conceptual diagram illustrating another aspect of the camera different from that described above. In the example of FIG. 6, the phase imparting means 11 imparts a plurality of types of phase differences to the second demultiplexed light subjected to the optical filter 31 and the light from the outside of the camera subjected to the optical filter 31 (including the light reflected from the target 23 in some cases), and multiplexes them. In this case, the phase imparting means 11 also serves as the multiplexing unit 13.

Next, an operation example of the camera will be described. Laser light is emitted from the light source 3. The light from the light source 3 is demultiplexed into the first demultiplexed light and the second demultiplexed light in the demultiplexing unit 5. In this case, the intensity of the first demultiplexed light may be weaker than the intensity of the second demultiplexed light. The first modulator modulates the first demultiplexed light to obtain a modulated signal. The first modulator may obtain, for example, an intensity-modulated signal. In the emission unit 9, the intensity-modulated signal is demultiplexed into a plurality of paths, which are emitted to a plurality of directions.

In the demultiplexing unit 5, the second demultiplexed light is given a plurality of types of phase shifts by the phase imparting means 11 depending on its spatial position. Examples of the phase shifts include a reference (0°), 90°, 180°, and 270°. As a result, it is possible to obtain a phase-imparted local light.

The intensity-modulated light hits on the target and is reflected. Its reflected light and the phase-imparted local light are multiplexed by the multiplexing unit 13. In addition to the reflected light, the light from the outside of the camera is also incident to the multiplexing unit. However, since the reflected light is intensified in relation to the phase-imparted local light, it is possible to reduce influence other than the reflected light. However, as described above, an optical filter may be provided to suppress light other than the reflected light, and the light from the outside of the camera subjected to the optical filter may be incident to the multiplexing unit.

As a preferable example of this camera, the emission unit 9 may sweep one or both of its height and direction. For example, when the emission unit 9 can sweep its height, it is possible to obtain a three-dimensional structure of the target as a subject. Then, using this camera, it is possible to obtain a three-dimensional distance image of an object around the target on which the camera is mounted.

The light multiplexed by the multiplexing unit is received by the light-receiving element 17, and is analyzed by the analysis processing unit 19, so that the position of the target subject or the distance between the subject and the camera is analyzed. Using this camera, it is possible to very rapidly detect a position of the subject or the like. This camera can be used, for example, for motion analysis in tennis, golf, running, walking, and swimming. In addition, this camera can be used as an in-vehicle camera in automatic driving.

INDUSTRIAL APPLICABILITY

The present invention is applicable to the industrial fields of electric devices.

REFERENCE SIGNS AND NUMERALS 3 light source
5 demultiplexing unit
7 first modulator
9 emission unit
11 phase imparting means
13 multiplexing unit
15 light-receiving unit
17 light-receiving element
19 analysis processing unit

What is claimed is:

1. A camera comprising:
a light source (3);
a demultiplexing unit (5) that demultiplexes a light from the light source (3) into a first demultiplexed light and a second demultiplexed light;
a first modulator (7) that modulates the first demultiplexed light to obtain a modulated signal;
an emission unit (9) that emits the modulated signal modulated by the first modulator (7); and
a phase imparting means (11) that imparts a plurality of types of phase shifts to the second demultiplexed light to obtain a phase-imparted local light,
wherein the camera further includes:
a multiplexing unit (13) that multiplexes a light incident from outside of the camera and the phase-imparted local light to obtain a multiplexed light,
a light-receiving element (17) having a light-receiving unit (15) that detects the multiplexed light, and
an analysis processing unit (19) that analyzes a position of a subject or a distance between the subject and the camera on the basis of the multiplexed light received by the light-receiving element (17).

2. The camera according to claim 1, further comprising:
a frequency adjusting means (33) that changes an emission wavelength of the light source (3); and
a control unit (35) that controls the frequency adjusting means (33),
wherein the control unit (35) controls the frequency adjusting means (33) to change the emission wavelength of the light source (3) when the light-receiving element (17) receives a light having a frequency equal to that of the first demultiplexed light and an intensity equal to or stronger than a threshold value.

3. The camera according to claim 1, wherein
the light-receiving element (17) includes a plurality of light-receiving device elements (15a) aligned in at least one line,
a first synchronization signal is obtained by synchronizing the light incident from the outside of the camera and the phase-imparted local light through digital signal processing for at least one of electric signals from the plurality of light-receiving device elements (15a) when the distance between the subject and the camera is longer than a coherent length of the light from the light source, and
the electric signal from the light-receiving element (17) is processed using the first synchronization signal to synchronize the light incident from the outside of the camera and the phase-imparted local light.

4. The camera according to claim 2, further comprising:
a bandpass optical filter provided on a front surface of the multiplexing unit or on a front surface of the light-receiving element; and
a lowpass filter provided between the light-receiving element and the analysis processing unit,
wherein a transmission band of the bandpass optical filter is wider than a change width of an emission wavelength caused by the frequency adjusting means, and
a cut-off frequency of the lowpass filter is higher than a modulation frequency of the first demultiplexed light.

* * * * *